United States Patent
Song et al.

(10) Patent No.: US 6,467,348 B1
(45) Date of Patent: Oct. 22, 2002

(54) MICROGYROSCOPE WITH TWO RESONANT PLATES

(75) Inventors: Hoon Song, Seoul; Seog-soon Baek, Suwon; Hyun-cheol Kim, Seoul; Byeoung Ju Ha, Suwon; Yong-soo Oh, Seongnam, all of (KR)

(73) Assignee: Samsung Electronics Co., Ltd. (KR)

( * ) Notice: Subject to any disclaimer, the term of this patent is extended or adjusted under 35 U.S.C. 154(b) by 56 days.

(21) Appl. No.: 09/702,845

(22) Filed: Nov. 1, 2000

(30) Foreign Application Priority Data

Nov. 4, 1999 (KR) .............................. 99-48591

(51) Int. Cl.⁷ .............................................. G01P 9/04
(52) U.S. Cl. .................................. 73/504.12; 73/504.14
(58) Field of Search ..................... 73/504.02, 504.04, 73/504.12, 504.14, 514.32, 514.38, 514.18, 514.29, 514.37

(56) References Cited

U.S. PATENT DOCUMENTS

| | | | | |
|---|---|---|---|---|
| 5,359,893 A | * | 11/1994 | Dunn ....................... | 73/504.12 |
| 5,728,936 A | * | 3/1998 | Lutz ........................ | 73/504.14 |
| 5,886,259 A | * | 3/1999 | Hulsing, II .............. | 73/504.12 |
| 5,895,850 A | * | 4/1999 | Buestgens ................ | 73/504.12 |
| 6,214,243 B1 | * | 4/2001 | Muenzel et al. ......... | 73/504.12 |

OTHER PUBLICATIONS

S. An et al., "Dual–Axis Microgyroscope With Closed–Loop Detection", Sensors and Actuators, May 1999, pp. 1–4.

\* cited by examiner

*Primary Examiner*—Helen Kwok
(74) *Attorney, Agent, or Firm*—Burns, Doane, Swecker & Mathis, LLP

(57) ABSTRACT

A microgyroscope with two resonant plates is provided. The microgyroscope includes a substrate; first and second frames provided on the substrate to have a predetermined height, the first and second frames facing each other; a plurality of anchors supporting the first and second frames with respect to the substrate; first and second resonant plates provided between the first and second frames to be separated from each other by a predetermined distance; and a matching link unit connected to the first and second resonant plates so that it links the motion of one resonant plate to the motion of the other resonant plate such that the matching link unit is moved by the motion of one resonant plate in a first direction and then moves the other resonant plate in a second direction opposite to the first direction. In the microgyroscope, the difference between the resonance frequencies of the two resonant plates is removed by a self resonant matching structure implemented by the matching link, so that the range of an allowable process error is large, and the microgyroscope can be easily manufactured. Additionally, the reliability and the linearity of a resonance structure are improved. Since the driving beam and the sensing beam are separately designed, mode coupling can be prevented, thereby increasing the sensing sensibility.

15 Claims, 7 Drawing Sheets

MICROGYROSCOPE WITH TWO RESONANT PLATES

BACKGROUND OF THE INVENTION

1. Field of the Invention

The present invention relates to a microgyroscope with two resonant plates, and more particularly, to a microgyroscope in which the difference between the resonance frequencies of two resonant plates is greatly decreased.

2. Description of the Related Art

A resonant type gyroscope as disclosed in U.S. Pat. No. 5,892,153 includes two resonant plates having an independent resonance structure and a single spring serving both as a spring used in a driving mode and as a spring used in a sensing mode. In such conventional resonant type gyroscopes having two resonant plates, the thicknesses or weights of springs supporting the two resonant plates may differ due to, for example, a process error occurring during patterning for a vibratory structure, thereby causing the resonance frequencies of the two resonant plates to be different. Here, even the several Hz of difference between the resonance frequencies of the two resonant plates has a bad influence on the sensitivity of a gyroscope. To overcome this problem, a gyroscope with a single resonant plate has been proposed. However, in such a gyroscope, it is very difficult to separate an acceleration signal from a signal because the influence of acceleration cannot be removed from such a structure having a single resonant plate. To solve this problem, a torsion driving method and a two axial angular speed meter have been proposed. However, such method and meter creates interference between components in different directions (cross-axis sensitivity).

When a spring employing a bending mode is applied to a thick structure in order to detect the displacement in the direction perpendicular to a substrate, an error in the thickness of the spring causes a large variation in the spring constant. Thus, reproducibility of processes cannot be guaranteed. To solve this problem, a spring employing a torsion mode is used. However, since a torsion mode spring is short, thermal stress caused by transformation due to a change in temperature is concentrated on the spring, and thus the structure linked to the spring easily becomes unstable.

Meanwhile, the sensitivity of resonant type gyroscopes is best when a sensing frequency and a driving frequency are synchronized. For this reason, tuning is performed by adjusting a sensing frequency. However, in conventional resonant type gyroscopes including a gyroscope disclosed in U.S. Pat. No. 5,892,153 which embody a spring used in a driving mode and a spring used in a sensing mode in a single spring structure, an abnormal mode may take place due to, for example, large transformation of the spring. Due to such an abnormal mode, it is difficult to adjust the difference between a sensing frequency and a driving frequency to be 100 Hz or lower.

SUMMARY OF THE INVENTION

To solve the above problems, it is a first object of the present invention to provide a microgyroscope having resonant plates of which the difference between the resonance frequencies is greatly reduced.

It is a second object of the present invention to provide a microgyroscope with two resonant plates allowing an error in manufacturing to be reduced, thereby increasing reproducibility and yields.

It is a third object of the present invention to provide a microgyroscope with two resonant plates which can protect a mode coupling effect due to the interference between a driving mode and a sensing mode.

It is a fourth object of the present invention to provide a microgyroscope with two resonant plates which maintains high stability against thermal stress.

Accordingly, to achieve the above objects of the invention, in one embodiment, there is provided a microgyroscope with two resonant plates, which includes a substrate; first and second frames provided on the substrate to have a predetermined height, the first and second frames facing each other; a plurality of anchors supporting the first and second frames with respect to the substrate; first and second resonant plates provided between the first and second frames to be separated from each other by a predetermined distance; and a matching link unit connected to the first and second resonant plates so that it links the motion of one resonant plate to the motion of the other resonant plate such that the matching link unit is moved by the motion of one resonant plate in a first direction and then moves the other resonant plate in a second direction opposite to the first direction.

In this embodiment, the matching link unit comprises an actuating rod of which the center portion is fixed, a first connecting portion extended from one end of the actuating rod and connected to the first resonant plate, and a second connecting portion extended from the other end of the actuating rod and connected to the second resonant plate.

Each of the first and second frames comprises a sub frame extending toward the matching link unit, and the center portion of the actuating rod is supported by the sub frames.

The center portions of the first and second frames are connected to the anchors through sensing beams. The sensing beams are formed at the center portions of the first and second frames, respectively, and connected to the anchors provided by the center portions of the first and second frames, respectively.

Each of the sensing beams in the first and second frames includes a buffer portion for alleviating stress. The buffer portion of the sensing beam is a loop type having a through portion at the center thereof.

The first and second resonant plates are connected to the first and second frames, respectively, by driving beams for a driving mode. Each of the driving beams has a portion extending in a direction in which a corresponding first or second resonant plate resonates and extending in a direction perpendicular to the resonance direction.

In another embodiment, there is provided a microgyroscope with two resonant plates, which includes substrate; first and second frames provided on the substrate to have a predetermined height, the first and second frames facing each other; a plurality of anchors supporting the center portions of the first and second frames, respectively, with respect to the substrate; sensing beams provided between the anchors and the first and second frames; first and second resonant plates provided between the first and second frames to be separated from each other by a predetermined distance; driving beams for connecting the first and second frames to the first and second resonant plates, respectively; and a matching link unit connected to the first and second resonant plates so that it can make the motion of one resonant plate bound to the motion of the other resonant plate such that the matching link unit is moved by the motion of one resonant plate in a first direction and then moves the other resonant plate in a second direction opposite to the first direction.

In this embodiment, the matching link unit includes an actuating rod of which the center portion is fixed, a first connecting portion extended from one end of the actuating rod and connected to the first resonant plate, and a second connecting portion extended from the other end of the actuating rod and connected to the second resonant plate. Each of the first and second frames includes a sub frame extending toward the matching link unit, and the center portion of the actuating rod is supported by the sub frames.

The sensing beams are formed at the center portions of the first and second frames, respectively, and connected to the anchors provided by the center portions of the first and second frames, respectively.

Each of the sensing beams in the first and second frames comprises a buffer portion for alleviating stress. The buffer portion of the sensing beam is a loop type having a through portion at the center thereof.

Each of the driving beams has a portion extending in a direction in which a corresponding first or second resonant plate resonates and extending in a direction perpendicular to the resonance direction.

BRIEF DESCRIPTION OF THE DRAWINGS

The above objectives and advantages of the present invention will become more apparent by describing in detail preferred embodiments thereof with reference to the attached drawings in which.

DETAILED DESCRIPTION OF THE PRESENT INVENTION

Hereinafter, embodiments of a microgyroscope according to the present invention will be described in detail with reference to the attached drawings.

Figure 1:
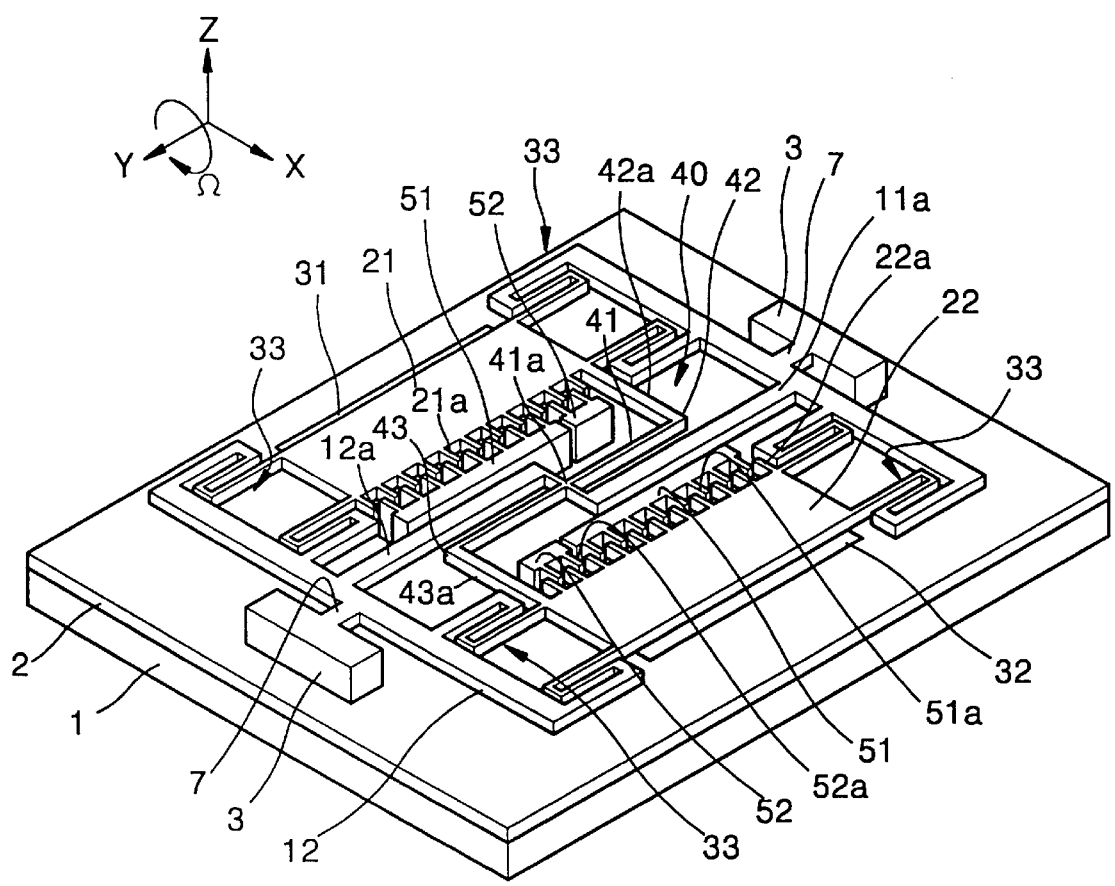
FIG. 1 is a schematic perspective view illustrating an embodiment of a microgyroscope according to the present invention.
Figure 2:
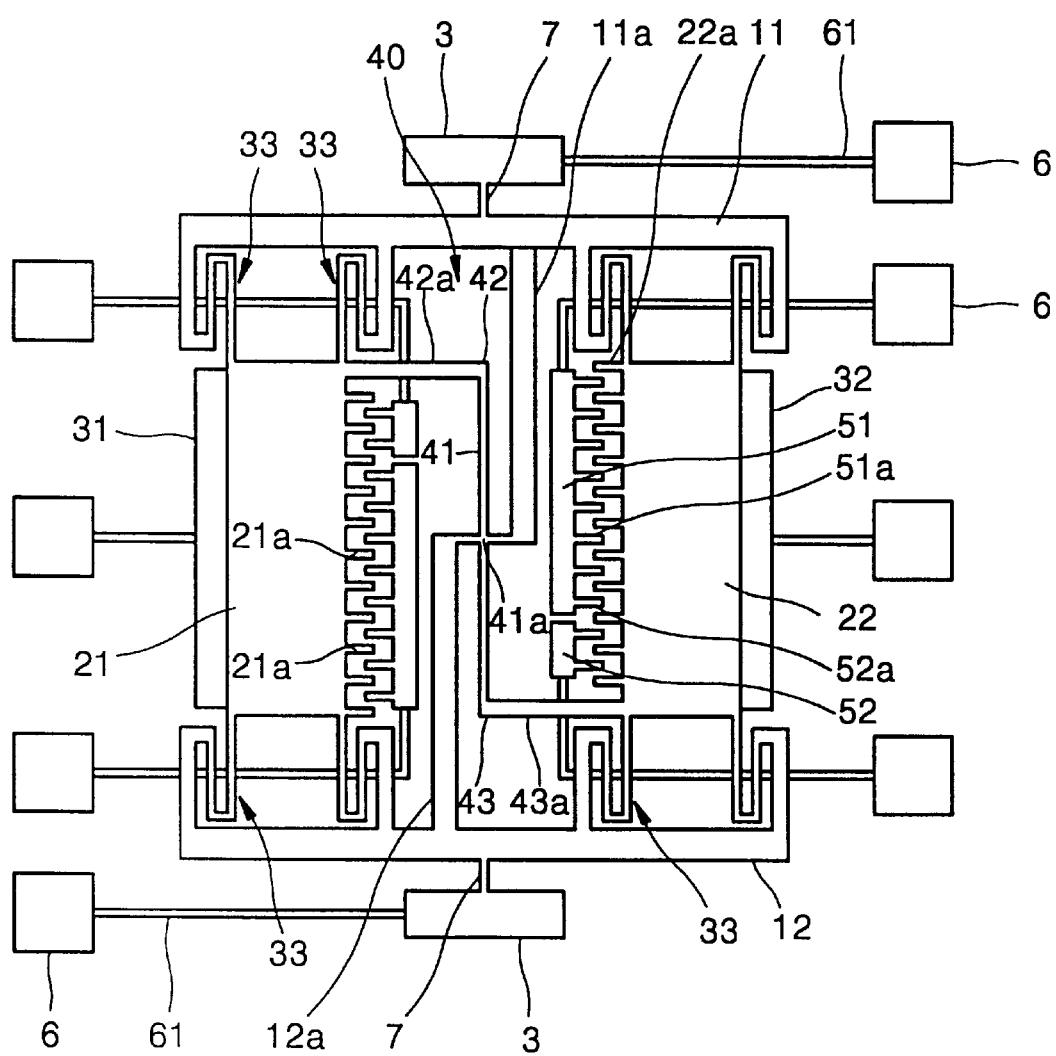
FIG. 2 is a schematic plan view of the embodiment of the microgyroscope of FIG. 1.

FIG. 1 is a schematic perspective view illustrating an embodiment of a microgyroscope according to the present invention. FIG. 2 is a plan view illustrating the layout of the overall structure of the embodiment of the microgyroscope of FIG. 1.

Referring to FIGS. 1 and 2, an insulation layer 2 is formed on a substrate 1, and a resonance structure is formed above the insulation layer 2. The resonance structure includes first and second frames 11 and 12 which are supported by anchors 3 to be parallel to each other and first and second resonant plates 21 and 22 between the first and second frames 11 and 12.

A sensing beam 7 is provided between each of the first and second frames 11 and 12 and a corresponding anchor 3. The sensing beams 7 serve as torsion springs with respect to the motion of the first and second frames 11 and 12.

The first and second resonant plates 21 and 22 are supported by driving beams 33 for a resonant mode. The driving beams 33 serve as springs connected to the first and second frames 11 and 12. As shown in the drawings, none of the driving beams 33 are in a straight line, but extends in the X and Y directions to allow the first and second resonant plates 21 and 22 to effectively resonate. Such a structure is optional. Like conventional gyroscopes, the driving beam 33 may be extended in the Y direction to be linear. In particular, the driving beams 33 are preferably extended from the four corners of each of the first and second resonant plates 21 and 22.

Sensing electrodes 31 and 32 are formed on the insulation layer 2 below the first and second resonant plates 21 and 22, respectively. The sensing electrodes 31 and 32 form condensers (or capacitors) together with the respective first and second resonant plates 21 and 22.

A matching link 40 is provided between the first and second resonant plates 21 and 22. The matching link 40 is connected to the first and second resonant plates 21 and 22 so that the motion of one resonant plate is linked to the motion of the other resonant plate such that the matching link 40 is moved by the motion of one resonant plate in a first direction and then moves the other resonant plate in a second direction opposite to the first direction.

For example, when the first resonant plate 21 moves toward the matching link 40, the matching link 40 moves the second resonant plate 22 toward itself. On the other hand, when the first resonant plate 21 moves away from the matching link 40, the matching link 40 moves the second resonant plate 22 away from itself.

Binding between the two resonant plates 21 and 22 allows the resonance frequencies of the resonant plates 21 and 22 to be the same. In actual tests, the two resonant plates 21 and 22 had the same resonance frequency due to the matching link 40. The matching link 40 has a seesaw structure, as shown in FIGS. 1 and 2, and includes an actuating rod 41, of which the center portion 41a is fixed, a first connecting portion 42a extended from one end 42 of the actuating rod 41 and connected to the first resonant plate 21, and a second connecting portion 43a extended from the other end 43 of the actuating rod 41 and connected to the second resonant plate 22. The center portion 41 a of the actuating rod 41 is steadily sustained by first and second sub frames 11a and 12a which are extended from the centers of the first and second frames 11 and 12, respectively.

A driving comb electrode 51 for inducing the resonance of each of the resonant plates 21 and 22 and a driving sensing comb electrode 52 for sensing the resonance of each of the resonant plates 21 and 22 are provided between each of the resonant plates 21 and 22 and the matching link 40.

Electrodes 21a, 22a, 51a and 52a alternating with each other in shape of the teeth of a comb are formed at the edges of the driving comb electrode 51 and the driving sensing comb electrode 52 and the edges of the first and second resonant plates 21 and 22, facing each other. The electrodes having a comb-like shape provide a resonance force for the first and second resonant plates 21 and 22 due to the electrostatic force therebetween.

In FIG. 2, reference numeral 61 denotes signal lines connected to the electrodes, and reference numeral 6 denotes pads for connecting the signal lines 61 to the outside. The signal lines and the pads are not shown in FIG. 1.

Figure 3:
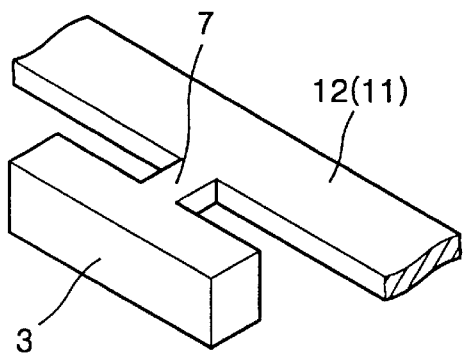
FIG. 3 is a cut-away perspective view of the sensing beam of the microgyroscope of FIG. 1.

FIG. 3 is a cut-away perspective view of the sensing beam used in a sensing mode. As described above, the sensing beam 7 is a torsion spring responding to the operation of each of the first and second frames 11 and 12 and also serves as a bending spring.

Figure 4:
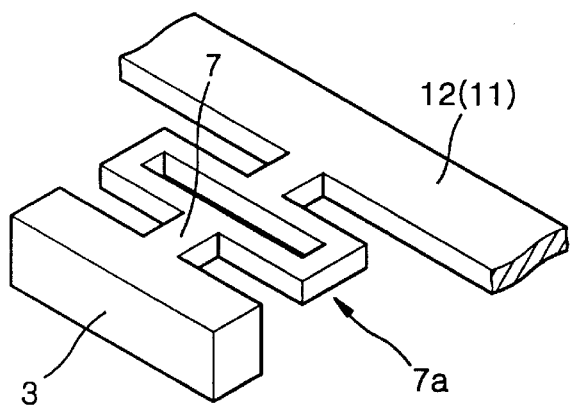
FIG. 4 is a cut-away perspective view of the sensing beam of another embodiment of a microgyroscope according to the present invention.

FIG. 4 illustrates a modified example of a sensing beam. The sensing beam 7 has a buffer portion 7a which can absorb and relieve the thermal stress of the sensing beam and external forces applied from a frame. The buffer portion 7a is provided at the center of the sensing beam 7 in the form of a rectangular loop or a rectangular frame having a through portion at the center thereof, as shown in the drawing.

Figure 5:
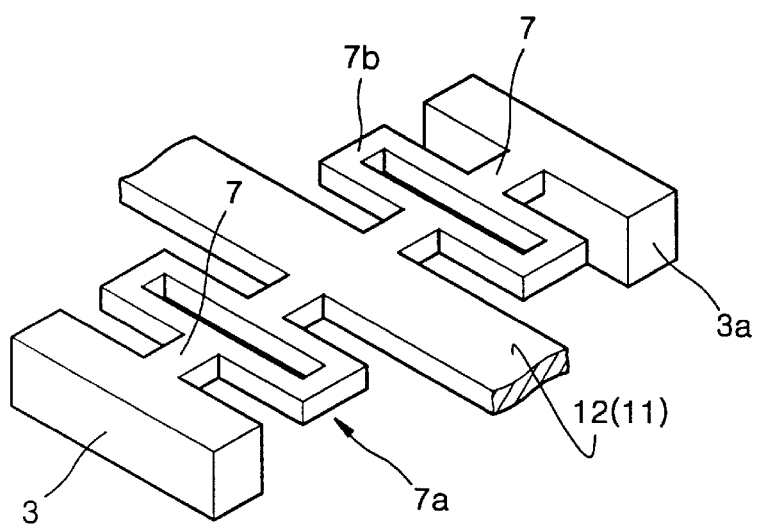
FIG. 5 is a cut-away perspective view of the sensing beam of still another embodiment of a microgyroscope according to the present invention.

FIG. 5 illustrates another modified example of a sensing beam. Anchors 3 and 3a are provided at both sides of each of the first and second frames 11 and 12 to be connected thereto through sensing beams 7. Buffer portions 7a and 7b which can absorb and relieve the thermal stress of the sensing beams 7 and external force applied from a frame is provided at the centers of the sensing beams 7, respectively, in the form of a rectangular loop or a rectangular frame. The shape of the buffer portions 7a and 7b can be modified into any shape which can effectively absorb and relieve stress.

As shown in FIG. 3, since the sensing beam 7, which is connected to the edge of the anchor 3 and serves as a torsion spring, is short and thick, stress caused by the thermal expansion or the thermal contraction of the structure due to a change in temperature is concentrated on the sensing beam 7. In this case, the stress has a bad influence on the operation of a resonant plate, thereby causing nonlinearity based on temperature.

Accordingly, it is preferable that the sensing beam 7 is provided with the buffer portions 7a and/or 7b at the center thereof in the form of a loop, as shown in FIGS. 4 and 5. Here, the sensing beam 7 is preferably designed to be fairly steady so that the resonance frequency in a resonant mode can be increased. Since thermal expansion, which occurs when the temperature changes, progresses slowly, a buffer portion having a loop shape is slowly transformed, and thus stress concentrated on the sensing beam 7 is alleviated.

In conventional gyroscopes using a single spring for both sensing mode and driving mode, a mode coupling effect occurs when a frequency in the sensing mode and a frequency in the driving mode are close to each other, and thus a nonlinear phenomenon appears. Unlike such conventional gyroscopes, in the present invention, a spring used in the driving mode and a spring used in the sensing mode are separately provided as a driving beam and a sensing beam, respectively, so that the mode coupling effect can be prevented even if a frequency in the driving mode and a frequency in the sensing mode are close to each other.

In such a microgyroscope according to the present invention, while the first and second resonant plates 21 and 22 are separately resonated by the respective driving comb electrodes 51, they are bound to each other by the matching link 40. Thus, anti-symmetrically and, consequently, they resonate along the X-axis at the same frequency. At this time, if an angular velocity ($\Omega$) is input in the direction of the Y-axis, Coriolis forces having the same magnitude and acting in opposite directions are applied to the resonant plates 21 and 22, respectively, moving anti-symmetrically, along the Z-axis. Due to the Coriolis forces, one the resonant plates 21 and 22 moves upward along the Z-axis, and the other moves downward along the Z-axis. The variations of capacitance between the resonant plates 21 and 22 and the respective underlying sensing electrodes 31 and 32 have the same magnitude and different signs. These variations are measured using a differential amplifier. Meanwhile, when acceleration is applied in the direction of the Z-axis, forces applied to the two resonant plates 21 and 22 offset each other since the two resonant plates 21 and 22 have a symmetric structure.

In such a structure, the resonant plates 21 and 22 may have different resonance frequencies due to a process error in a driving structure, but these resonance frequencies are made to be the same by the matching link 40.

Figure 6:
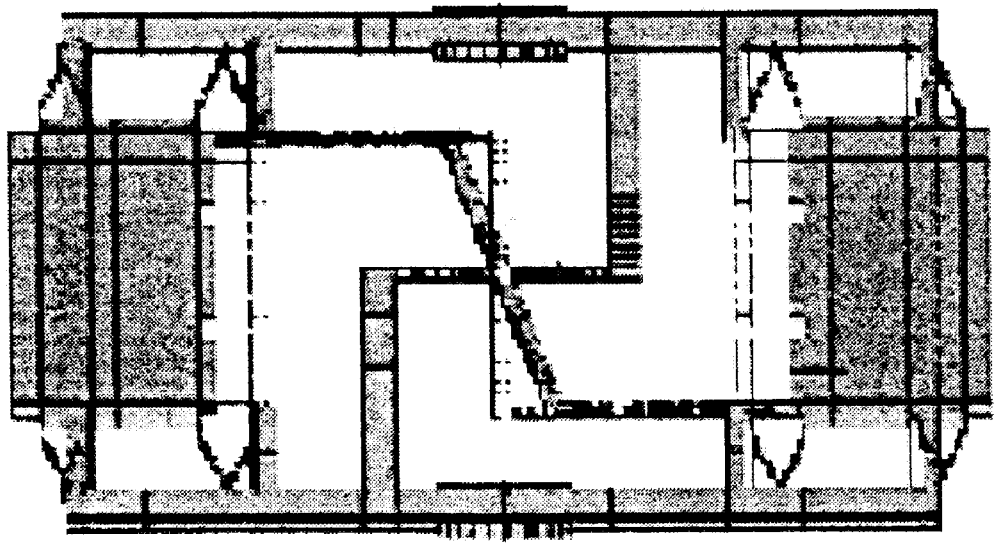
FIG. 6 illustrates transformation in a driving mode as a result of the simulation of a microgyroscope according to the present invention using ANSYS.
Figure 7:
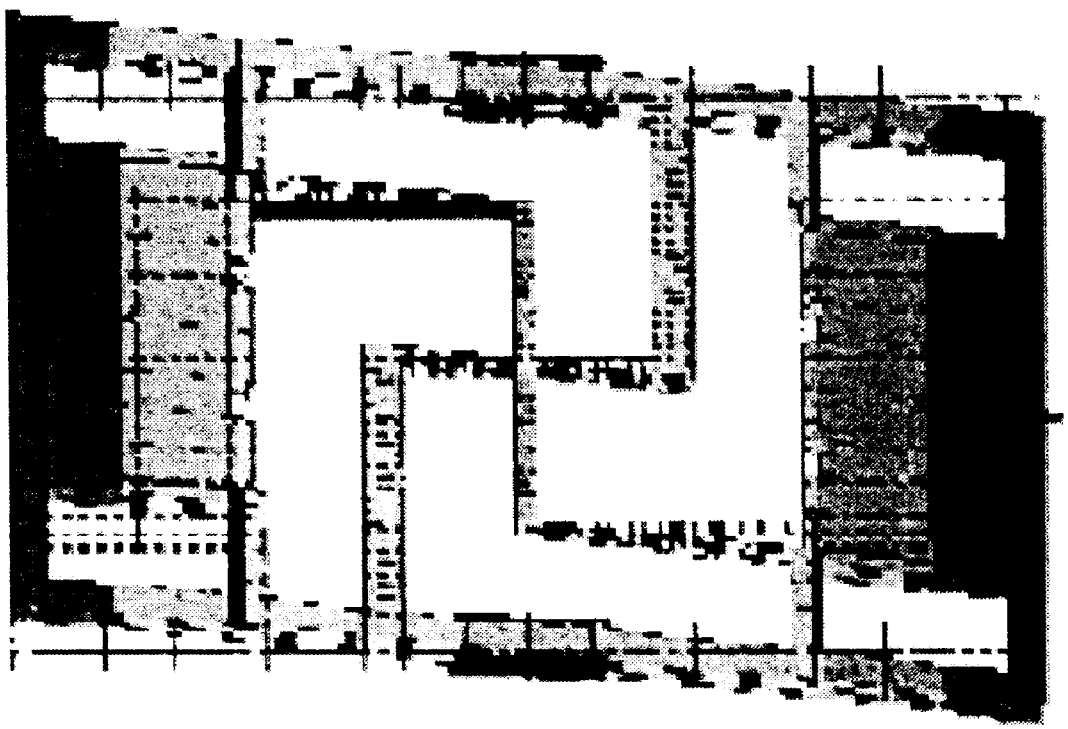
FIG. 7 illustrates transformation in a sensing mode as a result of the simulation of a microgyroscope according to the present invention using ANSYS.

FIGS. 6 and 7 illustrate the results of simulations using ANSYS. FIG. 6 illustrates transformation in a driving mode. As shown in the drawing, only a driving beam is transformed, and resonant plates act in opposite directions. FIG. 7 illustrates transformation in a sensing mode. Here, a sensing beam is transformed, so the entire microgyroscope is tilted.

Frequencies in the driving and sensing modes are designed to be 4.7 kHz and 4.8 kHz, respectively. The driving mode and the sensing mode are designed to be separated from each other by about 100 Hz taking into account process errors during actual manufacture and a bias voltage applied to sensing electrodes.

Figure 8:
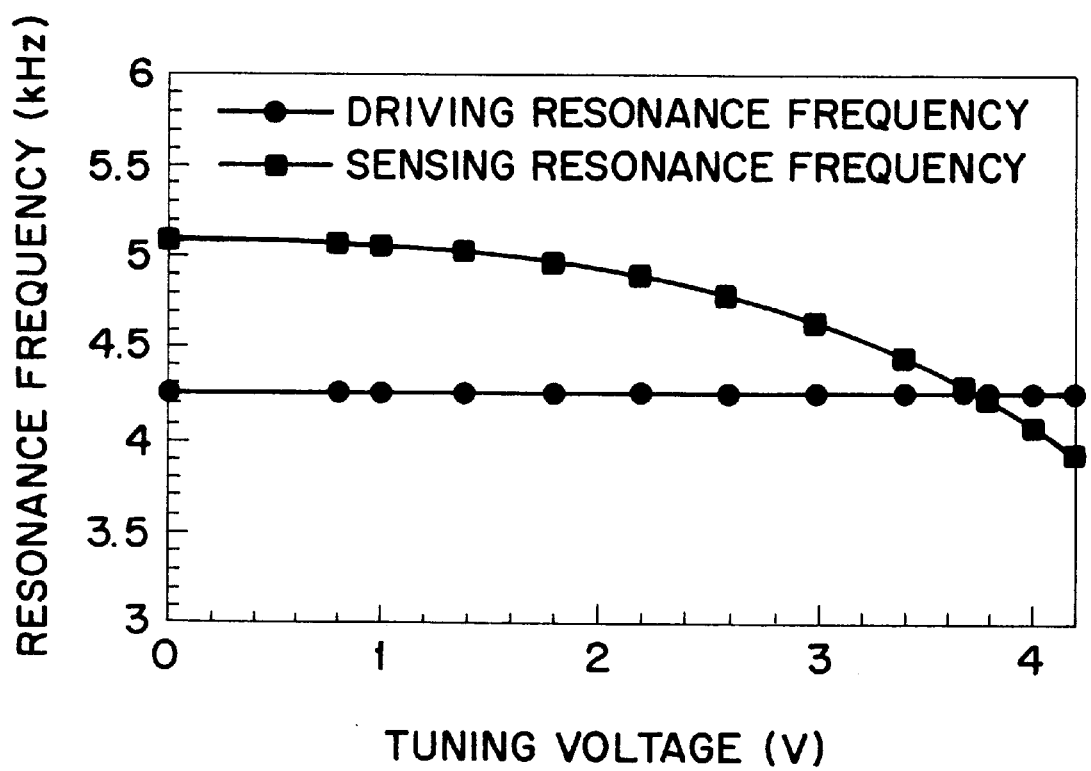
FIG. 8 illustrates changes in frequency in a sensing mode according to tuning voltages in a microgyroscope according to the present invention.

FIG. 8 illustrates changes in frequency in a sensing mode according to tuning voltages. A frequency in a driving mode and a frequency in a sensing mode were measured to be 4.25 kHz and 5.09 kHz, respectively. The difference between the frequencies in the driving and sensing modes caused by a process error was removed by performing electrical tuning by applying a bias voltage to sensing electrodes, so that the frequencies in the two modes became the same at 3.7 V, as shown in FIG. 8.

Figure 9:
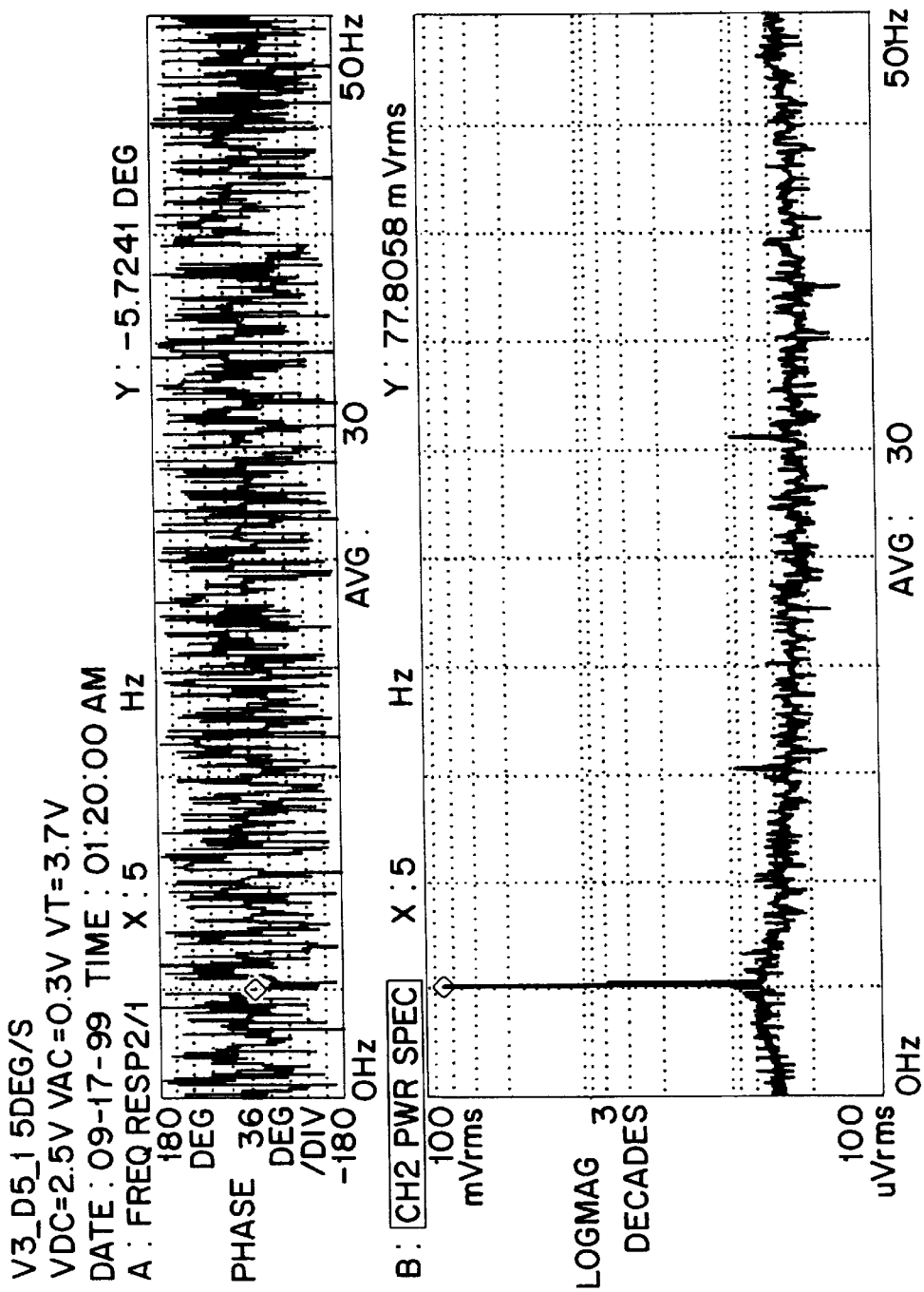
FIG. 9 illustrates a final output obtained when the output of a microgyroscope of the present invention obtained when an angular velocity is applied thereto at an amplitude of 5 Hz–10°/sec is demodulated.

FIG. 9 illustrates a final output obtained when the output of a microgyroscope of the present invention obtained when an angular velocity is applied thereto at an amplitude of 5 Hz–10°/sec is demodulated. It can be seen that equivalent resolution is about 0.05°/sec compared to a noise floor.

Conventionally, gyroscopes having two resonant plates have good performance such as structurally removing an acceleration signal, but are disadvantageous in that the resonance frequencies of the two resonant plates easily change during manufacture. Consequently, conventional gyroscopes have very low manufacturing yields. On the other hand, in the present invention, the difference between the resonance frequencies of two resonant plates is removed by a self resonant matching structure implemented by a matching link, so that the range of an allowable process error is large. Therefore, a microgyroscope can be easily manufactured.

In addition, it is difficult to apply a bending mode spring to conventional gyroscopes since a resonance structure including resonant plates and frames is thick. In the present invention, while a resonance structure can be formed thickly by employing a torsion mode spring, concentration of stress caused by the torsion mode spring is alleviated by a loop type buffer portion provided at a sensing beam between an anchor and a frame, thereby improving the reliability and linearity of the structure with respect to a change in temperature.

Since a spring for a driving mode and a spring for a sensing mode are separately provided as a driving beam and a sensing beam, respectively, in the present invention, mode coupling can be prevented, thereby increasing sensing sensitivity.

Such a microgyroscope according the present invention is small and cheap so that it can be applied to various fields of application such as automobiles, camcorders and virtual reality games.

Although the invention has been described with reference to particular embodiments, the embodiments should be construed to be examples, and it will be apparent to one of ordinary skill in the art that modifications of the described embodiment may be made. Therefore, the scope of the invention will be defined by the appended claims.

What is claimed is:

1. A microgyroscope with two resonant plates, comprising:
   a substrate;
   first and second frames provided on the substrate to have a predetermined height, the first and second frames facing each other;
   a plurality of anchors supporting the first and second frames with respect to the substrate;
   first and second resonant plates provided between the first and second frames to be separated from each other by a predetermined distance; and
   a matching link structure connected to the first and second resonant plates so that the matching link structure links the motion of one resonant plate to the motion of the other resonant plate such that the matching link structure is moved by the motion of one resonant plate in a first direction and then moves the other resonant plate in a second direction opposite to the first direction wherein the matching link structure comprises an actuating rod of which a central portion is fixed, a first connecting portion extended from one end of the actuating rod and connected to the first resonant plate, and a second connecting portion extended from the other end of the actuating rod and connected to the second resonant plate, and
   wherein each of the first and second frames comprises a sub frame extending toward the matching link structure, and the central portion of the actuating rod is supported by the sub frames.

2. The microgyroscope of claim 1, wherein central portions of the first and second frames are connected to the anchors through sensing beams.

3. The microgyroscope of claim 2, wherein the sensing beams are formed at the central portions of the first and second frames, respectively, and connected to the anchors provided at the central portions of the first and second frames, respectively.

4. The microgyroscope of claim 2, wherein each of the sensing beams in the first and second frames comprises a buffer portion for alleviating stress.

5. The microgyroscope of claim 4, wherein the buffer portion of the sensing beam is a loop type having a through portion at a central portion thereof.

6. The microgyroscope of claim 1, wherein the first and second resonant plates are connected to the first and second frames, respectively, by driving beams.

7. The microgyroscope of claim 6, wherein each of the driving beams has a portion extending in a direction in which a corresponding first or second resonant plate resonates and a portion extending in a direction perpendicular to the resonance direction.

8. A microgyroscope with two resonant plates, comprising:
   a substrate;
   first and second frames provided on the substrate to have a predetermined height, the first and second frames facing each other;
   a plurality of anchors supporting central portions of the first and second frames, respectively, with respect to the substrate;
   sensing beams provided between the anchors and the first and second frames;
   first and second resonant plates provided between the first and second frames to be separated from each other by a predetermined distance;
   driving beams for connecting the first and second frames to the first and second resonant plates, respectively; and
   a matching link structure connected to the first and second resonant plates so that the matching link structure can make the motion of one resonant plate bound to the motion of the other resonant plate such that the matching link structure is moved by the motion of one resonant plate in a first direction and then moves the other resonant plate in a second direction opposite to the first direction wherein the matching link structure comprises an actuating rod of which a central portion is fixed, a first connecting portion extended from one end of the actuating rod and connected to the first resonant plate, and a second connecting portion extended from the other end of the actuating rod and connected to the second resonant plate,
   wherein each of the first and second frames comprises a sub frame extending toward the matching link structure, and the central portion of the actuating rod is supported by the sub frames.

9. The microgyroscope of claim 8, wherein the sensing beams are formed at the central portions of the first and second frames, respectively, and connected to the anchors provided at the central portions of the first and second frames, respectively.

10. The microgyroscope of claim 8, wherein each of the sensing beams in the first and second frames comprises a buffer portion for alleviating stress.

11. The microgyroscope of claim 10, wherein the buffer portion of the sensing beam is a loop type having a through portion at the center thereof.

12. The microgyroscope of claim 8, wherein each of the driving beams has a portion extending in a direction in which a corresponding first or second resonant plate resonates and a portion extending in a direction perpendicular to the resonance direction.

13. The microgyroscope of claim 9, wherein each of the driving beams has a portion extending in a direction in which a corresponding first or second resonant plate resonates and extending in a direction perpendicular to the resonance direction.

14. The microgyroscope of claim 10, wherein each of the driving beams has a portion extending in a direction in which a corresponding first or second resonant plate resonates and extending in a direction perpendicular to the resonance direction.

15. The microgyroscope of claim 11, wherein each of the driving beams has a portion extending in a direction in which a corresponding first or second resonant plate resonates and a portion extending in a direction perpendicular to the resonance direction.

* * * * *